(12) United States Patent
So

(10) Patent No.: US 7,409,765 B2
(45) Date of Patent: Aug. 12, 2008

(54) COMBINATION COOKING UTENSIL

(75) Inventor: Wan Yun So, Kowloon (HK)

(73) Assignee: Perception Digital Limited, Kowloon (HK)

( * ) Notice: Subject to any disclaimer, the term of this patent is extended or adjusted under 35 U.S.C. 154(b) by 310 days.

(21) Appl. No.: 11/070,287

(22) Filed: Mar. 3, 2005

(65) Prior Publication Data

US 2006/0196057 A1 Sep. 7, 2006

(51) Int. Cl.
A47J 43/28 (2006.01)
(52) U.S. Cl. ............... 30/123; 30/129; 30/137; 30/322; 99/342; 374/155
(58) Field of Classification Search ........... 30/123, 30/142, 322–323, 129, 137, 140, 147–150; 99/342, 419, 421 A, 343, 344; 374/155, 374/147, 208; 294/907, 49, 55.5; D7/684, D7/683; D10/57
See application file for complete search history.

(56) References Cited

U.S. PATENT DOCUMENTS

| | | | | |
|---|---|---|---|---|
| 3,552,210 A | * | 1/1971 | Wright, Jr. | 374/155 |
| 4,874,928 A | * | 10/1989 | Kasai | 99/325 |
| 5,075,970 A | * | 12/1991 | Albert | 30/123 |
| 5,189,793 A | * | 3/1993 | Ratzon et al. | 30/123 |
| 5,299,356 A | * | 4/1994 | Maxwell, III | 30/322 |
| 5,421,089 A | * | 6/1995 | Dubus et al. | 30/142 |
| 5,463,207 A | * | 10/1995 | Kang | 219/708 |
| D412,126 S | * | 7/1999 | Aquilina | D10/57 |
| D416,209 S | * | 11/1999 | Norcross et al. | D10/57 |
| 5,983,783 A | * | 11/1999 | Archard et al. | 99/342 |
| D422,224 S | * | 4/2000 | Yu | D10/57 |
| D427,025 S | * | 6/2000 | Lee | D7/683 |
| D429,973 S | * | 8/2000 | Handelsman | D7/684 |
| D439,809 S | * | 4/2001 | Ming et al. | D7/683 |
| 6,412,398 B1 | * | 7/2002 | Norcross et al. | 99/342 |
| 6,442,846 B1 | * | 9/2002 | Michael | 30/322 |
| 6,539,842 B1 | * | 4/2003 | Chapman et al. | 99/342 |
| 6,594,908 B2 | * | 7/2003 | Di Amico | 30/322 |
| 6,675,483 B2 | * | 1/2004 | Bond et al. | 30/142 |
| 6,837,148 B1 | * | 1/2005 | Deschenes et al. | 99/325 |
| 7,104,682 B2 | * | 9/2006 | Harris et al. | 30/322 |
| 7,146,667 B2 | * | 12/2006 | Elsener | 7/118 |
| 2003/0139843 A1 | * | 7/2003 | Hu et al. | 700/211 |
| 2008/0016698 A1 | * | 1/2008 | Simpson | 30/142 |

* cited by examiner

Primary Examiner—Jason Prone
(74) Attorney, Agent, or Firm—Leydig, Voit & Mayer, Ltd.

(57) ABSTRACT

A combination cooking utensil for use in food preparation has a handle with a shank extending from the handle to a utensil head. An audio input/output and audio player are provided with the housing for storing and playing audio files. A power supply is located within the handle for powering the audio player.

9 Claims, 4 Drawing Sheets

COMBINATION COOKING UTENSIL

BACKGROUND OF THE INVENTION

1. Field of the Invention

The invention relates to cooking utensils for use in the preparation of food items.

2. Description of the Prior Art

A number of combination cooking utensils are known that combine different types of utensil such as a fork and a spatula. The utensil can be used as one or other device but cannot perform more than one task simultaneously. Furthermore, the utensil does not entertain its user.

It would be advantageous to have a combination cooking utensil that could perform more than one tasks simultaneously to ease the burden on a food preparer, and/or which entertains its user.

SUMMARY OF THE INVENTION

Accordingly, it is an object of the present invention to provide a combination cooking utensil which can perform a number of different functions simultaneously in food preparation, or which entertains its user.

According to the invention there is provided a combination cooking utensil for use in food preparation comprising a handle, a shank extending from the handle to a utensil head, an audio input/output device provided on the handle, an audio player provided with the housing and coupled with the input/output device for storing and playing audio files, and a power supply located within the handle for powering the audio player.

Preferably, the utensil head comprises a pair of fork tines.

Preferably, the utensil includes a motor powered by the power supply and coupled to the tined head for rotating the head with respect to the handle.

Preferably, the utensil includes an antenna coupled to the audio player for receiving broadcast audio transmissions.

Preferably, the input/output device comprises a speaker through which the audio files can be played.

Preferably, the utensil includes a display mounted with the housing and a weight sensor located on the shank or tines, the audio player comprising a controller for indicating a value of weight on the display in response to signals from the weight sensor.

Preferably, the weight sensor is a strain gauge.

Preferably, the utensil includes a display mounted with the handle and a temperature sensor located on the tines, the audio player comprising a controller for indicating a value of temperature on the display in response to signals from the temperature sensor.

Preferably, the utensil includes a light device located on the handle for projecting a beam of light away from the handle.

Preferably, the light device is positioned to project the beam of light in a direction of the utensil head.

Preferably, the audio player comprises a display and a user input device mounted with the handle, and a controller and memory storage unit located within the handle.

Further aspects of the invention will become apparent from the following drawings and description.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

Figure 1:
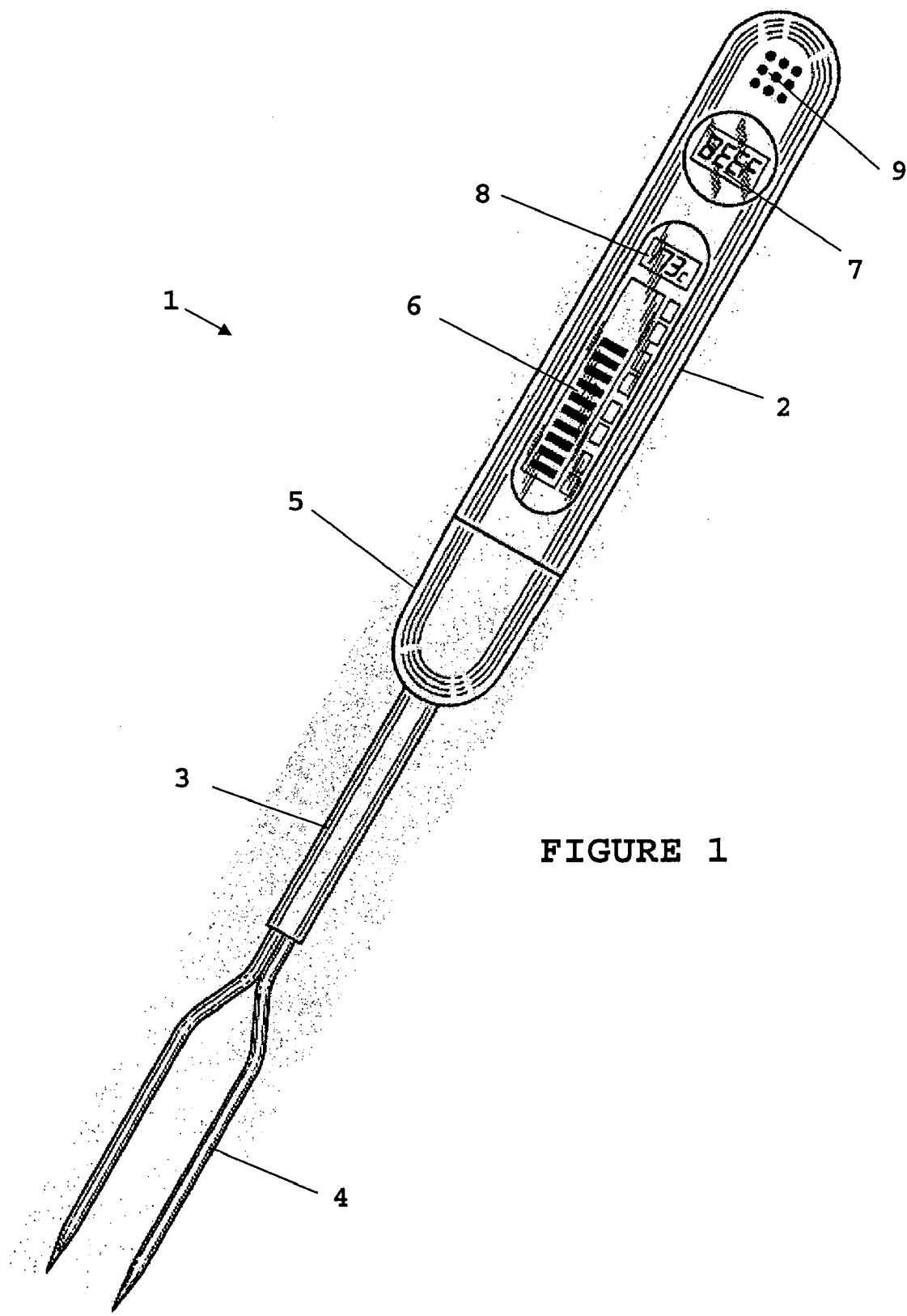
FIG. 1 is a preferred embodiment of a combination cooking utensil according to the invention.
Figure 2:
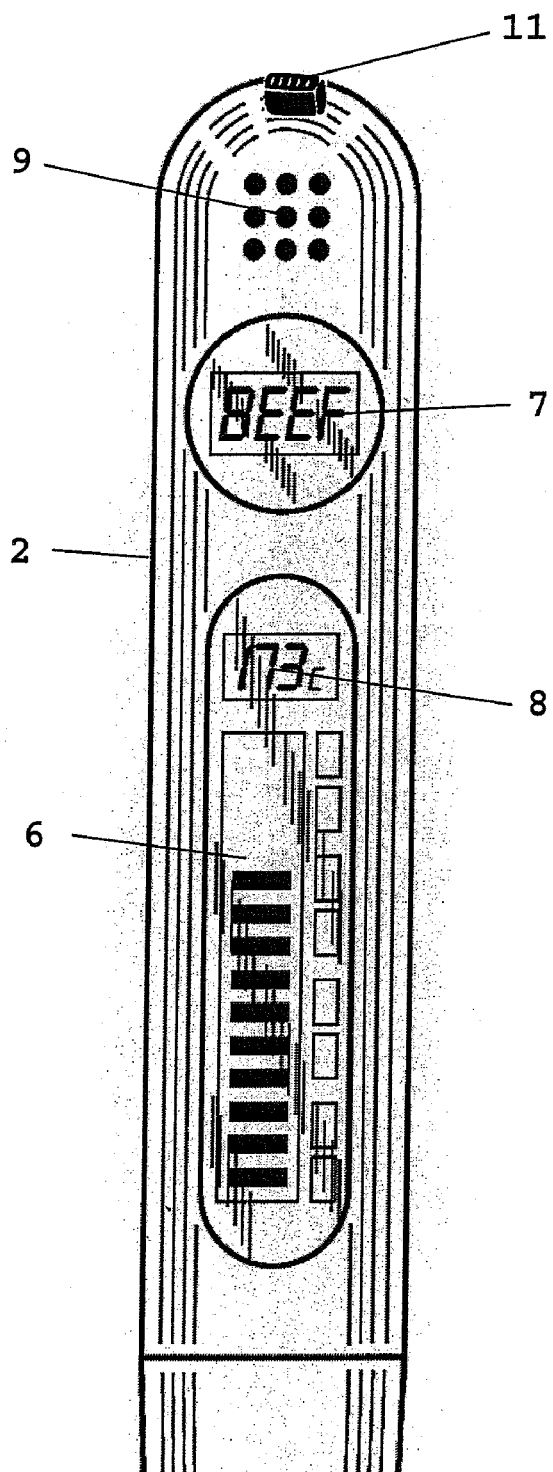
FIG. 2 is the handle of the utensil.
Figure 3:
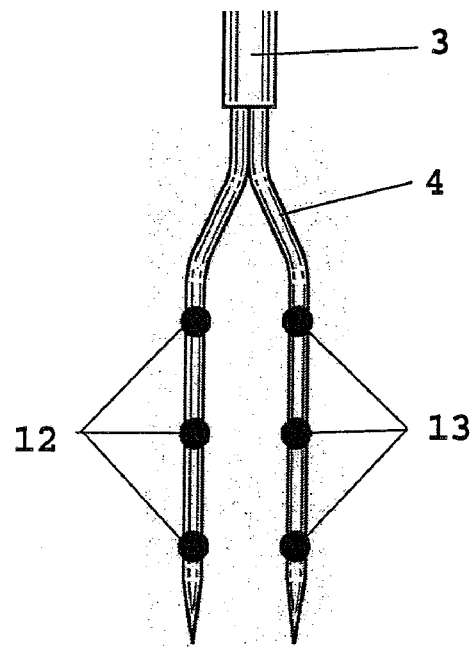
FIG. 3 is the tines of the utensil.
Figure 4:
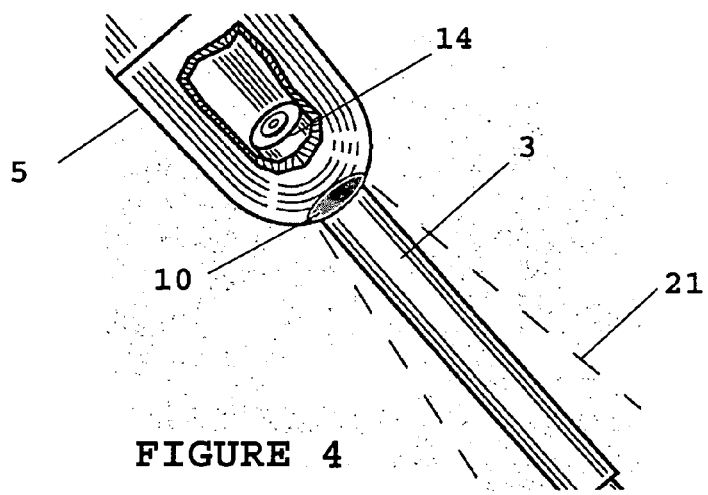
FIG. 4 is the lower handle area of the utensil.
Figure 5:
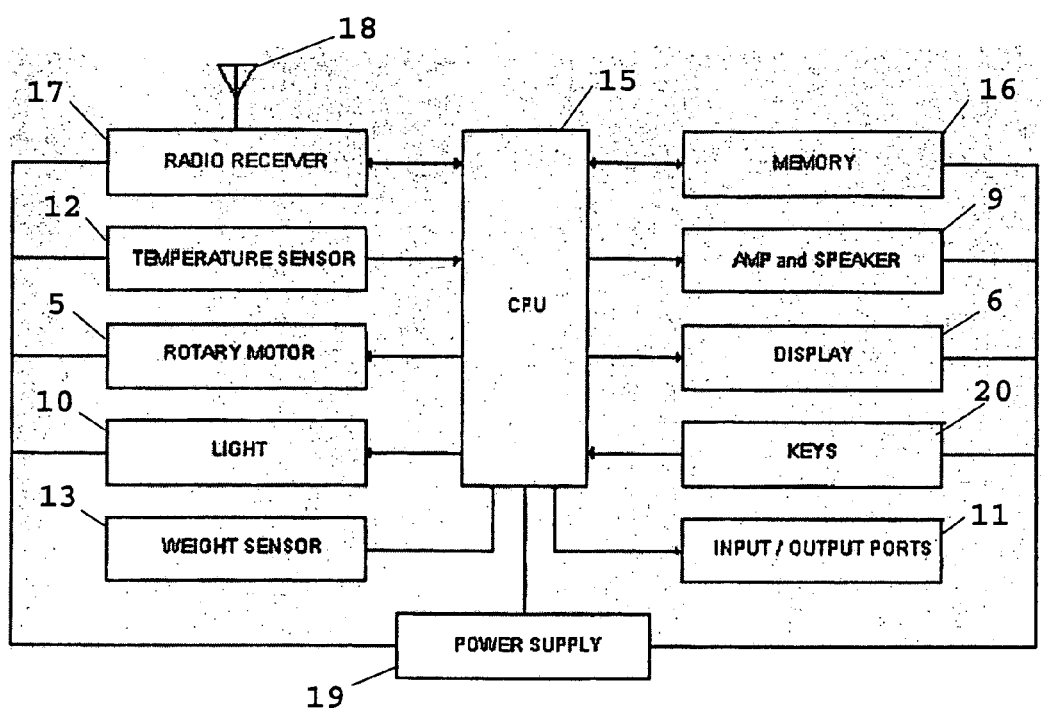
FIG. 5 is a schematic of the functional components of the utensil.
Figure 6:
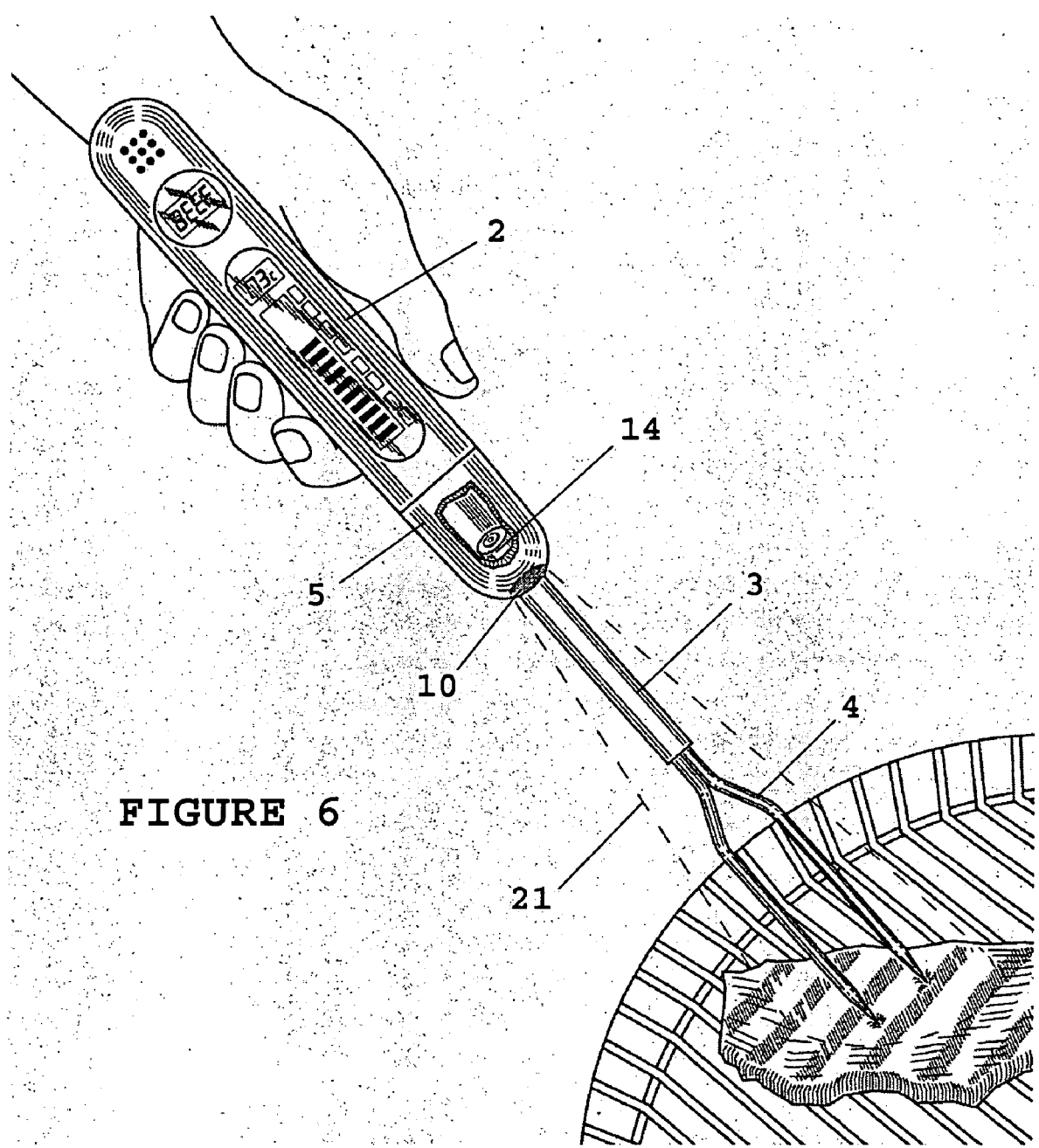
FIG. 6 is the utensil in use.

In the drawings there is depicted a combination cooking utensil 1 for use in preparing food items. The utensil comprises a handle 2 having a shank 3 extending to a utensil head comprising two fork tines 4. The shank 3 is rotationally mounted to handle 2 and coupled to a motor 5 for rotation relative to the handle 2. On the handle 2 are provided three liquid crystal displays (LCDs) 6, 7 and 8 and an audio speaker 9. Adjacent motor 5 is a lighting device 10 for projecting a beam of light 21 away from the handle 2 in the direction of tines 4. At the distal end of handle 2 there are input/output ports 11. These ports 11 comprise a USB connector and audio jack for connecting the utensil to a personal computer (PC) and earphones/headphones respectively.

In alternative embodiments the input/output ports 11 may be or include a universal serial bus port, a firewire port, an infrared port, a radio frequency port, or the like. A universal serial bus port is a new type of port and operates with data communication protocol that permits a plurality of newly designed peripheral devices to be connected to the utensil in a daisy-chain configuration. A firewire port is an audio/video digital interface according to the Institute of Electrical and Electronics Engineers 1394 standard. The other types of port are well known to one skilled in the art.

On a first of the fork tines 4 there are three temperature sensors 12 for sensing the internal temperature of a food item on the tines 4. On the second of the fork tines 4 are three weight sensors in the form of strain gauges 13. The temperature sensors 12 and strain gauges 13 are wired back to handle 2 via rotary slip-rings 14 position adjacent motor 5. The temperature sensors 12 may be a conductive sensor such as a thermocouple, resistance temperature detector (RTD), thermistor or IC & diodes or a non-conductive sensor such as an infrared sensor. The strain gauge 13 senses bending of the second tine 4 for determining weight information, and in alternative embodiments may be located on shank 3.

Located within handle 2 is a controller 15 coupled to a memory storage device 16, a radio receiver 17 and internal antenna 18 and user input keys 20. A power supply 19 is provided for supplying the controller 15 and other power dependent devices within the fork 1. The controller is also coupled to the temperature and weight sensors 12, 13, the light 10, displays 6, 7, 8, motor 5, amp and speaker 9 and input/output ports 11.

In the preferred embodiment the memory storage device 16 includes both Read Only Memory (ROM) and Random Access Memory (RAM). ROM is used to contain controller instructions and programs while RAM is employed for operating and working data. In alternative embodiments the memory device 16 may also include flash memory, a memory stick, and/or a removable memory device.

User input keys 20 have a typical alphanumeric or operational notation on their top or tactile surface. In alternative embodiments the keys are coded by colour, shape or other graphic symbol, and may also be coded by texture. In the preferred embodiment the keys are of the type requiring mechanical movement for activation with a depression stroke of at least one millimetre, and preferably two to five millimetres. In addition, the keys might have tactile feedback, as known in the art. Audible feedback may also be provided, either through a mechanical feedback mechanism associated with the key structure or a separate electronic mechanism.

Power supply unit can be a standard replaceable battery such as known AA type, or in the preferred embodiment a rechargeable battery rechargeable by an external supply connected to the device via input/output ports 11. Some embodiments may have a small solar cell on handle 2 for recharging the battery.

The device can be coupled to a computer for downloading audio files, in MP3 format for example, for storage in memory device 16. The controller 15 is programmed with a personal audio player function for playing the stored audio files or broadcast AM/FM radio via the amplifier and speaker 9 or through audio output jack portion of input/output ports 11. Such personal audio player functions are well-known and their implementation is well within the capabilities of a skilled addressee.

In the preferred embodiment the three displays 6, 7, 8 are provided for displaying different user information. Long bar type display 6 is an LCD bar display used to indicate battery state of charge. The second LCD display 7, adjacent speaker 9, is used to display personal audio player information such as track/song number or radio station information. The third LCD display 8 is used to display temperature and/or weight information as described below. In alternative embodiments a single LCD display may be used. The displays may also be of an organic LCD, LED display, organic LED display (OLED), thin film transistor display, or like type.

In some embodiments one or more LCD displays 6, 7, 8 and input keys 20 are combined in a touch sensitive screen (touch screen). With a touch screen a user can select from options displayed on the touch screen's viewing surface by touching the surface adjacent the desired option or, in some designs, by touching the option directly.

The controller 15 is also provided with temperature and weight functions for receiving sensor signals from temperature sensors 12 and weight sensors 13 and displaying temperature and weight information on the LCD display 8 in response to these signals. The temperature and/or weight information may be displayed continuously, or in the preferred embodiment is displayed for a short period of 5 seconds in response to the user pressing an input key 20. A single press displays temperature information and a second press within the 5 seconds displays weight information for a further 5 seconds. The display is turned off after the 5 seconds. Implementation of such temperature and weight functions is well within the capabilities of a skilled addressee.

The controller 15 also controls the rotary motor 5 for turning the shank 3 and tines 4 while barbecuing food. The motor is started and stopped by the user pressing an input key 20. In a preferred embodiment a database relating food item types, weight, cooking time and internal cooked temperature is stored in the memory device 16. The utensil is provided with a user manual containing a food item reference by number, for example beef (1), lamb (2), chicken (3) and fish (4). The user selects the food item number, which is displayed on the LCD display, using input keys 20. The controller senses the weight and initial internal temperature of the food item on the tines 4 and uses the database to determine a preferred cooking time. The user holds the food item over the cooking heat and the controller starts the motor for the required time. The motor is stopped when the preferred cooking time has elapsed or the internal temperature reaches the cooked temperature whichever occurs first. The controller sounds a "beep" on speaker 9 to signal the user. If the food item internal temperature has not reached cooked temperature within the database preferred cooking time the controller sounds two "beeps" to warn the user that further cooking is required.

A person using the utensil for, say, barbecuing can be entertained by listening to the audio player through speaker 9 or personal headphones connected to output port 11. A food item is located on tines 4 and held over a flame or barbecue heat source. The food item can be rotated automatically by motor 5 rotating shank 3 and tines 4 to relief burden on the food preparer. The food preparer is also provided with temperature information relating to the food so that they might know when the food is cooked. Weight information is also provided which will assist the controller and user to determine how long the cooking time might be. When barbecue is undertaken at night time the light 10 can be activated, by operating an input key 20, which shines a beam of light onto the food item enabling the user to access the cooked state of the food item visually.

Where in the foregoing description reference has been made to integers or elements having known equivalents then such are included as if individually set forth herein.

Embodiments of the invention have been described, however it is understood that variations, improvement or modifications can take place without departure from the scope of the appended claims.

What is claimed is:

1. A combination cooking utensil for food preparation comprising:
   a handle,
   a shank extending from the handle,
   tines connected to the shank,
   a motor located in the handle and connected to the shank for rotating the shank with respect to the handle,
   an audio output device located in the handle,
   a memory located in the handle for storing audio files,
   a weight sensor located on one of the tines,
   a temperature sensor located on one of the tines,
   a display disposed on the handle
   a controller located within the handle and connected to the memory and to the audio output device for sending the audio files to the audio output device,
   a power supply within the handle for supplying power to the motor, the controller, the weight sensor, the temperature sensor, and the display, wherein the controller controls indication on the display of weight and temperature of a food item engaged by the tines, in response to signals from the weight sensor and the temperature sensor, respectively, and controls operation of the motor in response to signals from the weight sensor and the temperature sensor.

2. The combination cooking utensil according to claim 1, wherein the weight sensor comprises at least one strain gauge.

3. The combination cooking utensil according to claim 1, wherein the weight sensor comprises a plurality of strain gauges longitudinally spaced along one of the tines.

4. The combination cooking utensil according to claim 1 further including an antenna coupled to the controller for receiving broadcast audio transmissions.

5. The combination cooking utensil according to claim 1, wherein the audio output device comprises a speaker.

6. The combination cooking utensil according to claim 1 further including a light-producing device located on the handle for projecting a beam of light away from the handle.

7. The combination cooking utensil according to claim 6, wherein the light-producing device is positioned to project a beam of light toward the tines.

8. A combination cooking utensil comprising:
- an elongate handle having longitudinally opposed first and second ends,
- a shank extending from the handle at the first end,
- first and second tines connected to the shank,
- a speaker located on the handle adjacent the second end,
- a memory located in the handle for storing audio files,
- a motor located proximate the first end of the handle, within the handle, and connected to the shank for rotating the shank with respect to the handle,
- a plurality of strain gauges longitudinally spaced apart from each other and disposed on the first tine for measuring deflection on the first time by a food item engaged by the first tine,
- plurality of temperature sensors longitudinally spaced apart from each other and disposed on the second tine,
- a display disposed on the handle,
- a controller located within the handle and connected to the memory and to the speaker for acoustical output of audio derived from the audio files, and
- a power supply located within the handle for supplying power to the controller, the motor, the strain gauges, the temperature sensors, and the display, wherein the controller controls indication on the display of weight and temperature of a food item engaged by the first and second tines, in response to signals from the strain gauges and the temperature sensors, respectively, and controls operation of the motor in response to signals from the strain gauges and the temperature sensors.

9. A combination cooking utensil for food preparation comprising:
- a handle,
- a shank extending from the handle to a utensil head having a pair of fork tines,
- a motor located in the handle and coupled to the shank for rotating the shank with respect to the handle,
- a weight sensor located on one of the fork tines,
- a temperature sensor located on one of the fork tines, and
- a controller coupled to the weight and temperature sensors and programmed to determine a preferred cooking time of a food item in response to signals received from the weight and temperature sensors, and coupled to the motor for controlling operation of the motor for the preferred cooking time.

* * * * *